I. W. STEWART.

Diaper-Pin.

No. 6,698. Reissued Oct. 11, 1875.

Witnesses:

H. C. Maffenberg

W. Lovell

Inventor:

Isaac W. Stewart per [illegible]

Atty

UNITED STATES PATENT OFFICE.

ISAAC W. STEWART, OF NEW YORK, N. Y.

IMPROVEMENT IN DIAPER-PINS.

Specification forming part of Letters Patent No. 106,422, dated August 16, 1870; reissue No. 6,698, dated October 11, 1875; application filed August 20, 1875.

*To all whom it may concern:*

Be it known that I, ISAAC W. STEWART, of the city, county, and State of New York, have invented a new and Improved Diaper-Pin; and that the following is a full, clear, and exact description of the same, reference being had to the accompanying drawings and to the letters of reference marked thereon, making a part of this specification.

This invention is in the nature of an improvement in diaper or safety pins; and the invention consists in a safety-pin constructed with the rear end of the wire forming the pin bent at or nearly at a right angle to the pin, and also in the shield or guard of a diaper-pin, constructed with a series of corrugations, substantially in the manner hereinafter described.

Figure 1:
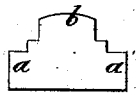
Figure 4:
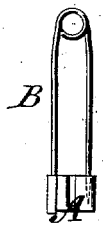
Figure 2:
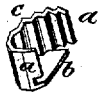
Figure 3:
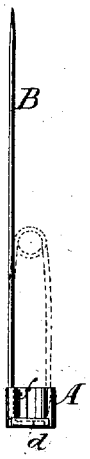
Figure 5:
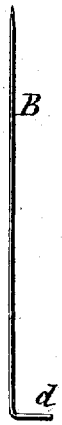

In the accompanying sheet of drawings, Figure 1 is a plan of the blank which I use to make the shield. Fig. 2 is the same when partially bent or shaped and ready for application to the wire. Fig. 3 is a plan of the shield when finished and attached to the wire. Fig. 4 is a plan of a diaper-pin as usually made before my invention; and Fig. 5 is a side view, showing the angular bend of end of pin.

Similar letters of reference indicate like parts in the several figures.

Diaper or safety pins, as heretofore constructed, have had the shields A for the point of the pin made by first striking up disks of metal in the shape of cups, then flattening them, and making a slot in the flattened side, and finally soldering them to the unsharpened end of the wire, as shown in Fig. 4.

This operation is not only slow, but expensive, and it is particularly objectionable, since the wire is attached to the side of the shield by solder, which not only makes an unsightly joint, but a weak connection.

By my invention these objections are obviated, for I construct my shields of flat blanks of metal, of the form shown in Fig. 1, or any other desired form, and by suitable dies the ends *a* and sides *b* are bent, as shown in Fig. 2, and a series of corrugations, *c*, formed on the front side of the shield. The unsharpened end of the wire B is bent at or nearly at a right angle, and this bent end *d* (which should be long enough to extend across the bottom of the shield, as indicated in Fig. 3) is inserted into the shield, and by means of swaging or otherwise the ends *a* and sides *b* of the shield are forced tightly in contact with the wire B and the bent part *d* thereof, holding the shield and the wire of the pin firmly and strongly in position. The bent end *d* stiffens the pin, making it firm at its point of attachment to the shield; and, besides, it offers more surface for the purpose of attaching it to the shield, whether in the manner just described or by solder, and the corrugations *c* stiffen and render strong the shield A, so that it may be made of extremely light metal.

Care should be taken to have the ends of the parts *a* to fall short of meeting when bent down over the wire sufficiently to leave an opening, *f*, for the admission of the free point of the pin within the shield.

Having thus described the construction of my invention, what I claim as new, and desire to secure by Letters Patent, is—

1. In a diaper-pin, the unsharpened end of the pin, bent at or nearly at right angles, and extending across the bottom of the shield, and re-enforcing the same, substantially in the manner and for the purpose described.

2. In a diaper-pin, the shield thereof, being constructed with a series of corrugations, substantially as and for the purpose described.

I. W. STEWART.

Witnesses:
H. L. WATTENBERG,
M. LOVELL.